United States Patent

Farrington, Jr. et al.

[11] Patent Number: 5,932,068
[45] Date of Patent: *Aug. 3, 1999

[54] SOFT TISSUE

[75] Inventors: Theodore Edwin Farrington, Jr.; Julia Smith Bahlman; Mark Alan Burazin; Fung-jou Chen; Kristin Ann Goerg, all of Appleton, Wis.; Michael Alan Hermans; Robert John Makolin, both of Neeah, Wis.; Michael John Rekoske, Appleton, Wis.

[73] Assignee: Kimberly-Clark Worldwide, Inc., Neenah, Wis.

[*] Notice: This patent is subject to a terminal disclaimer.

[21] Appl. No.: 08/815,407

[22] Filed: Mar. 10, 1997

Related U.S. Application Data

[60] Continuation of application No. 08/399,277, Mar. 6, 1995, Pat. No. 5,656,132, which is a division of application No. 08/082,684, Jun. 24, 1993, Pat. No. 5,607,551.

[51] Int. Cl.⁶ .................................................. D21H 17/00
[52] U.S. Cl. .......................................... 162/117; 162/109
[58] Field of Search .................................... 162/109, 117, 162/9

[56] References Cited

U.S. PATENT DOCUMENTS

| | | | |
|---|---|---|---|
| 3,301,746 | 1/1967 | Sanford et al. | 162/113 |
| 3,537,954 | 11/1970 | Justus | 162/305 |
| 3,629,056 | 12/1971 | Forrest | 162/305 |
| 3,692,622 | 9/1972 | Dunning | 161/124 |
| 3,726,750 | 4/1973 | Stillings | 161/57 |
| 3,776,807 | 12/1973 | Dunning et al. | 161/124 |
| 3,806,406 | 4/1974 | Ely | 162/206 |
| 3,812,000 | 5/1974 | Salvucciii, Jr. et al. | 162/111 |
| 3,821,068 | 6/1974 | Shaw et al. | 162/111 |
| 3,846,228 | 11/1974 | Ely et al. | 162/206 |
| 3,905,863 | 9/1975 | Ayers | 162/113 |
| 3,926,716 | 12/1975 | Bates | 162/113 |
| 3,974,025 | 8/1976 | Ayers | 162/113 |
| 3,994,771 | 11/1976 | Morgan, Jr. et al. | 162/113 |
| 4,072,557 | 2/1978 | Schiel | 162/207 |
| 4,100,017 | 7/1978 | Flautt, Jr. | 162/111 |
| 4,102,737 | 7/1978 | Morton | 162/113 |
| 4,120,747 | 10/1978 | Sarge, III et al. | 162/117 |
| 4,125,430 | 11/1978 | Grossman | 162/207 |
| 4,125,659 | 11/1978 | Klowak et al. | 428/153 |
| 4,127,637 | 11/1978 | Pietreniak et al. | 264/114 |
| 4,157,938 | 6/1979 | Clemens et al. | 162/207 |
| 4,191,609 | 3/1980 | Trokhan | 162/113 |
| 4,196,045 | 4/1980 | Ogden | 162/117 |
| 4,309,246 | 1/1982 | Nulit et al. | 162/113 |
| 4,440,597 | 4/1984 | Wells et al. | 162/111 |
| 4,448,638 | 5/1984 | Klowak | 162/111 |
| 4,464,224 | 8/1984 | Matolcsy | 162/111 |
| 4,469,735 | 9/1984 | Trokhan | 428/154 |
| 4,529,480 | 7/1985 | Trokhan | 162/109 |
| 4,551,199 | 11/1985 | Weldon | 162/109 |

(List continued on next page.)

FOREIGN PATENT DOCUMENTS

| | | |
|---|---|---|
| 0342646 | 11/1989 | European Pat. Off. . |
| 0568404 | 11/1993 | European Pat. Off. . |
| 3207136 | 7/1991 | Japan . |
| 1212473 | 2/1969 | United Kingdom ................... 162/109 |

OTHER PUBLICATIONS

Modern Pulp and Paper Making, Reinhold Publishing Corporation, (New York) pp.313–314, 1957.

*Primary Examiner*—Brenda A. Lamb
*Attorney, Agent, or Firm*—Gregory E. Croft

[57] ABSTRACT

Soft throughdried tissues, which are sufficiently soft to serve as premium bathroom tissues, can be made without the use of a Yankee dryer. The typical Yankee functions of building machine direction and cross-machine direction stretch are replaced by a wet end rush transfer and the throughdrying fabric design, respectively. It is particularly advantageous to form the tissue with chemimechanically treated fibers in at least one layer. The resulting tissues have high bulk (about 6 cubic centimeters per gram or greater) and low stiffness.

4 Claims, 10 Drawing Sheets

U.S. PATENT DOCUMENTS

| | | | |
|---|---|---|---|
| 4,556,450 | 12/1985 | Chuang et al. | 162/204 |
| 4,637,859 | 1/1987 | Trokhan | 162/109 |
| 4,808,266 | 2/1989 | Faurie | 162/102 |
| 4,849,054 | 7/1989 | Klowak | 162/111 |
| 4,940,513 | 7/1990 | Spendel | 162/112 |
| 4,959,125 | 9/1990 | Spendel | 162/158 |
| 5,048,589 | 9/1991 | Cook et al. | 162/109 |
| 5,059,282 | 10/1991 | Ampulski et al. | 162/111 |
| 5,098,519 | 3/1992 | Ramasubramanian et al. | 162/109 |
| 5,098,522 | 3/1992 | Smurkoski et al. | 162/358 |
| 5,102,501 | 4/1992 | Eber et al. | 162/111 |
| 5,126,015 | 6/1992 | Pounder | 162/206 |
| 5,129,988 | 7/1992 | Farrington, Jr. | 162/123 |
| 5,348,620 | 9/1994 | Hermans et al. | 162/9 |
| 5,656,132 | 8/1997 | Farrington et al. | 162/109 |

SOFT TISSUE

This application is a continuation of application Ser. No. 08/399,277 entitled "SOFT TISSUE" and filed in the U.S. Patent and Trademark Office on Mar. 6, 1995, now U.S. Pat. No. 5,656,132 which is a divisional of application Ser. No. 08/082,684 filed on Jun. 24, 1993, now U.S. Pat. No. 5,607,551. The entirety of this Application is hereby incorporated by reference.

BACKGROUND OF THE INVENTION

In the manufacture of tissue products such as bath tissue, a wide variety of product characteristics must be given attention in order to provide a final product with the appropriate blend of attributes suitable for the product's intended purposes. Among these various attributes, improving softness has always been a major objective for premium products. Major components of softness include stiffness and bulk (density), with lower stiffness and higher bulk (lower density) generally improving perceived softness.

Traditionally, tissue products have been made using a wet-pressing process in which a significant amount of water is removed from a wet laid web by pressing or squeezing water from the web prior to final drying. In particular, while supported by an absorbent papermaking felt, the web is squeezed between the felt and the surface of a rotating heated cylinder (Yankee dryer) using a pressure roll as the web is transferred to the surface of the Yankee dryer for final drying. The dried web is thereafter dislodged from the Yankee dryer with a doctor blade (creping), which serves to partially debond the dried web by breaking many of the bonds previously formed during the wet-pressing stages of the process. Creping generally improves the softness of the web, albeit at the expense of a significant loss in strength.

More recently, throughdrying has become a more prevalent means of drying tissue webs. Throughdrying provides a relatively noncompressive method of removing water from the web by passing hot air through the web until it is dry. More specifically, a wet-laid web is transferred from the forming fabric to a coarse, highly permeable throughdrying fabric and retained on the throughdrying fabric until it is dry. The resulting dried web is softer and bulkier than a wet-pressed uncreped dried sheet because fewer papermaking bonds are formed and because the web is less dense. Squeezing water from the wet web is eliminated, although subsequent transfer of the web to a Yankee dryer for creping is still used to final dry and/or soften the resulting tissue.

While there is a processing incentive to eliminate the Yankee dryer and make an uncreped throughdried tissue, attempts to make throughdried tissue sheets without using a Yankee dryer (uncreped) have heretofore lacked adequate softness when compared to their creped counterparts. This is partially due to the inherently high stiffness and strength of an uncreped sheet, since without creping there is no mechanical debonding in the process. Because stiffness is a major component of softness, the use of uncreped throughdried sheets has been limited to applications and markets where high strength is paramount, such as for industrial wipers and towels, rather than for applications where softness is required, such as for bath tissue, premium household towels, and facial tissue in the consumer market.

SUMMARY OF THE INVENTION

It has now been discovered that tissues having properties particularly suitable for use as a bath tissue can be made using certain pretreated papermaking fibers in an appropriate process. A throughdrying tissue making process in which the tissue web is not adhered to a Yankee dryer and hence is uncreped is preferred. The resulting tissues of this invention are characterized by a unique combination of high bulk and low stiffness as compared to available creped bath tissue products and especially so as compared to prior uncreped throughdried products.

The stiffness of the products of this invention can be objectively represented by either the maximum slope of the machine direction (MD) load/elongation curve for the tissue (hereinafter referred to as the "MD Max Slope") or by the machine direction Stiffness Factor (hereinafter defined), which further takes into account the caliper of the tissue and the number of plies of the product. In accordance with this invention, by overcoming the inherently high stiffness of uncreped throughdried sheets, an acceptably soft tissue with high bulk and low stiffness can be produced. In addition, the products of this invention can have a high degree of stretch of about 10 percent or greater, which provides in-use durability. Such soft, strong and stretchable tissue products with high bulk have heretofore never been made. While this invention is particularly applicable to bath tissue, it is also useful for other paper products where softness is a significant attribute, such as for facial tissue and household paper towels.

Hence in one aspect, the invention resides in a soft tissue having a Bulk (hereinafter defined) of about 9 cubic centimeters per gram or greater and an MD Max Slope of about 10 or less.

In another aspect, the invention resides in an a soft tissue comprising one or more uncreped throughdried plies and having a MD Max Slope of about 10 or less, preferably also having a Bulk of about 6 cubic centimeters per gram or greater.

In another aspect, the invention resides in a soft tissue having a Bulk of about 9 cubic centimeters per gram or greater and a MD Stiffness Factor of about 150 or less.

In another aspect, the invention resides in a soft tissue comprising one or more uncreped throughdried plies and having a MD Stiffness Factor of about 150 or less, preferably also having a Bulk of about 6 cubic centimeters per gram or greater.

In a further aspect, the invention resides in a method of making a soft tissue sheet comprising: (a) forming an aqueous suspension of papermaking fibers having a consistency of about 20 percent or greater; (b) mechanically working the aqueous suspension at a temperature of 140° F. or greater provided by an external heat source, such as steam, with a power input of about 1 horsepower-day per ton of dry fiber or greater to curl the fibers; (c) diluting the aqueous suspension of curled fibers to a consistency of about 0.5 percent or less and feeding the diluted suspension to a tissue-making headbox; (d) depositing the diluted aqueous suspension onto a forming fabric to form a wet web; (e) dewatering the wet web to a consistency of from about 20 to about 30 percent; (f) transferring the dewatered web from the forming fabric to a transfer fabric traveling at a speed of from about 10 to about 80 percent slower than the forming fabric; (g) transferring the web to a throughdrying fabric whereby the web is macroscopically rearranged to conform to the surface of the throughdrying fabric; and (h) throughdrying the web to final dryness.

The Bulk of the products of this invention is calculated as the quotient of the Caliper (hereinafter defined), expressed in microns, divided by the basis weight, expressed in grams per square meter. The resulting Bulk is expressed as cubic centimeters per gram. For the products of this invention, Bulks can be about 6 cubic centimeters per gram or greater, preferably about 9 cubic centimeters per gram or greater, suitably from about 9 to about 20 cubic centimeters per gram, and more specifically from about 10 to about 15 cubic centimeters per gram. The products of this invention derive the Bulks referred to above from the basesheet, which is the sheet produced by the tissue machine without post treatments such as embossing. Nevertheless, the basesheets of this invention can be embossed to produce even greater bulk or aesthetics, if desired, or they can remain unembossed. In addition, the basesheets of this invention can be calendered to improve smoothness or decrease the Bulk if desired or necessary to meet existing product specifications.

The MD Max Slope of the products of this invention can be about 10 or less, preferably about 5 or less, and suitably from about 3 to about 6. Determining the MD Max Slope will be hereinafter described in connection with FIG. 6. The MD Max Slope is the maximum slope of the machine direction load/elongation curve for the tissue. The units for the MO Max Slope are kilograms per 3 inches (7.62 centimeters), but for convenience the MD Max Slope values are hereinafter referred to without the units.

The MD Stiffness Factor of the products of this invention can be about 150 or less, preferably about 100 or less, and suitably from about 50 to about 100. The MD Stiffness Factor is calculated by multiplying the MD Max Slope by the square root of the quotient of the Caliper divided by the number of plies. The units of the MD Stiffness Factor are (kilograms per 3 inches)-microns$^{0.5}$, but for simplicity the values of the MD Stiffness Factor are hereinafter referred to without the units.

The Caliper as used herein is the thickness of a single sheet, but measured as the thickness of a stack of ten sheets and dividing the ten sheet thickness by ten, where each sheet within the stack is placed with the same side up. Caliper is expressed in microns. It is measured in accordance with TAPPI test methods T402 "Standard Conditioning and Testing Atmosphere For Paper, Board, Pulp Handsheets and Related Products" and T411 om-89 "Thickness (caliper) of Paper, Paperboard, and Combined Board" with Note 3 for stacked sheets. The micrometer used for carrying out T411 om-89 is a Bulk Micrometer (TMI Model 49-72-00, Amityville, N.Y.) having an anvil diameter of 4$\frac{1}{16}$ inches (103.2 millimeters) and an anvil pressure of 220 grams/square inch (3.39 kiloPascals). After the Caliper is measured, the same ten sheets in the stack are used to determine the average basis weight of the sheets.

The products of this invention can be single-ply products or multi-ply products, such as two-ply, three-ply, four-ply or greater. One-ply products are advantageous because of their lower cost of manufacture, while multi-ply products are preferred by many consumers. For multi-ply products it is not necessary that all plies of the product be the same, provided at least one ply is in accordance with this invention.

The basis weight of the products of this invention can be from about 5 to about 70 grams per square meter (gsm), preferably from about 10 to about 40 gsm, and more preferably from about 20 to about 30 gsm. For a single-ply bath tissue, a basis weight of about 25 gsm is preferred. For a two-ply tissue, a basis weight of about 20 gsm per ply is preferred. For a three-ply tissue, a basis weight of about 15 gsm per ply is preferred.

The tissues of this invention can also be characterized by a relatively high degree of machine direction stretch. The amount of machine direction stretch can be about 10 percent or greater, suitably from about 15 to about 25 or 30 percent. Cross-machine direction (CD) stretch can be about 3 percent or greater, suitably from about 7 to about 10 percent. Machine direction stretch can be imparted to the sheet upon transfer of the web from the forming fabric to the transfer fabric, and/or by transfer from a transfer fabric to another transfer fabric, and/or by transfer of the web from a transfer fabric to the throughdrying fabric. Cross-machine direction stretch is dominated by the throughdrying fabric design.

In order to be suitable for use as a bath tissue, the machine direction tensile strength is preferably about 600 grams per 3 inches (7.62 centimeters) of width or greater, more suitably from about 700 to about 1500 grams. Cross-machine direction tensile strengths are preferably about 300 grams per 3 inches (7.62 centimeters) of width or greater, more suitably from about 400 to about 600 grams.

The MD Tensile Strength, MD Tensile Stretch, CD Tensile Strength and CD Tensile Stretch are obtained according to TAPPI Test Method 494 OM-88 "Tensile Breaking Properties of Paper and Paperboard" using the following parameters: Crosshead speed is 10.0 in/min. (254 mm/min), full scale load is 10 lb (4,540 g), jaw span (the distance between the jaws, sometimes referred to as the gauge length) is 2.0 inches (50.8 mm), specimen width is 3 inches (76.2 mm). The tensile testing machine is a Sintech, Model CITS-2000 (Systems Integration Technology Inc., Stoughton, Mass.; a division of MTS Systems Corporation, Research Triangle Park, N.C.).

Papermaking fibers useful for purposes of this invention include any cellulosic fibers which are known to be useful for making paper, particularly those fibers useful for making relatively low density papers such as facial tissue, bath tissue, paper towels, dinner napkins and the like. Suitable fibers include virgin softwood and hardwood fibers, as well as secondary or recycled cellulosic fibers, and mixtures thereof. Especially suitable hardwood fibers include eucalyptus and maple fibers. As used herein, "secondary fiber" means any cellulosic fiber which has previously been isolated from its original matrix via physical, chemical or mechanical means and, further, has been formed into a fiber web, dried to a moisture content of about 10 weight percent or less and subsequently reisolated from its web matrix by some physical, chemical or mechanical means.

A key component in tissue softness is sheet stiffness or resistance to folding. Previous processes decrease stiffness via creping, layering, patterned attachment to the Yankee dryer or some combination of these. Neither the first nor last process is possible in an uncreped throughdried process. Therefore, layering is expected to play a key role in reducing sheet stiffness at the required overall tensile strength. Ideally, the desired overall strength would be carried in a very thin layer (for low stiffness) which has been treated to give very high strength or modulus (perhaps by refining or chemical action). The remaining layer(s) would comprise fibers which have been treated to significantly reduce their strength (modulus). The key to achieving low stiffness at required overall strength then becomes treating or modifying the fibers in such a way as to maximize the difference in strength (modulus) of the layers. An ideal modification for the weaker layer would simultaneously reduce tensile strength and increase bulk, as this would decrease modulus the greatest.

The modification methods to produce soft fibers for the relatively weak layers include mechanical modification, chemical modification and combinations of mechanical modification and chemical modification. Mechanical modifications are achieved by methods which permanently deform the fibers through mechanical action. These methods introduce curl, kinks, and microcompressions into the fiber which decrease fiber-to-fiber bonding, decrease sheet tensile strength, and increase sheet bulk, stretch, porosity and softness. Examples of suitable mechanical modification methods include flash drying, dry fiberizing and wet high-consistency curling. While any process or mechanical device which imparts fiber curl may increase sheet softness, those which produce more curl or a stiffer curl or a more permanent curl upon exposure to water will increase sheet softness to a greater extent and are hence preferred. In addition, softness-enhancing chemicals can be added to mechanically-modified fibers either before or after mechanical modification to produce further increases in softness over the mechanical treatment or wet end chemical addition alone. A preferred means for modifying the fibers for purposes of this invention is to pass the fibers through a shaft disperser, which is a wet high-consistency curling device which works the fibers (imparts high shear forces and a high degree of inter-fiber friction) at elevated temperature. Fibers which have been passed through a shaft disperser (sometimes referred to herein as "dispersing") are referred to as "dispersed fibers". These fibers possess certain properties which make them particularly advantageous for making uncreped throughdried tissues because of their bulk building ability and their softness.

The consistency of the aqueous fiber suspension which is subjected to the dispersing treatment must be high enough to provide significant fiber-to-fiber contact or working which will alter the surface properties of the treated fibers. Specifically, the consistency can be at least about 20, more preferably from about 20 to about 60, and most preferably from about 30 to about 50 dry weight percent. The consistency will be primarily dictated by the kind of machine used to treat the fibers. For some rotating shaft dispersers, for example, there is a risk of plugging the machine at consistencies above about 40 dry weight percent. For other types of dispersers, such as the Bivis machine (commercially available from Clextral Company, Firminy Cedex, France), consistencies greater than 50 can be utilized without plugging. This device can be generally described as a pressurized twin screw shaft disperser, each shaft having several screw flights oriented in the direction of material flow followed by several flights oriented in the opposite direction to create back pressure. The screw flights are notched to permit the material to pass through the notches from one series of flights to another. It is desirable to utilize a consistency which is as high as possible for the particular machine used in order to maximize fiber-to-fiber contact.

The temperature of the fibrous suspension during dispersing can be about 140° F. or greater, preferably about 150° F. or greater, more preferably about 210° F. or greater, and most preferably about 220° F. or greater. The upper limit on the temperature is dictated by whether or not the apparatus is pressurized, since the aqueous fibrous suspensions within an apparatus operating at atmospheric pressure cannot be heated beyond the boiling point of water. Interestingly, it is believed that the degree and permanency of the curl is greatly impacted by the amount of lignin in the fibers being subjected to the dispersing process, with greater effects being attainable for fibers having higher lignin content. Hence high yield pulps having a high lignin content are particularly advantageous in that fibers previously considered not suitably soft can be transformed into suitably soft fibers. Such high yield pulps, listed in decreasing order of lignin content, are groundwood, thermomechanical pulp (TMP), chemimechanical pulp (CMP), and bleached chemithermomechanical pulp (BCTMP). These pulps have lignin contents of about 15 percent or greater, whereas chemical pulps (kraft and sulfite) are low yield pulps having a lignin content of about 5 percent or less.

The amount of power applied to the fibrous suspension during dispersing also impacts the fiber properties. In general, increasing the power input will increase the fiber curl. However, it has also been found that the fiber curl reaches a maximum upon reaching a power input of about 2 horsepower-days per ton (HPD/T) (1.6 kilowatt-days per tonne) of dry fiber in suspension. A preferred range of power input is from about 1 to about 3 HPD/T (0.8 to about 2.5 kilowatt-days per tonne), more preferably about 2 HPD/T (1.6 kilowatt-days per tonne) or greater.

In working the fibers during dispersing, it is necessary that the fibers experience substantial fiber-to-fiber rubbing or shearing as well as rubbing or shearing contact with the surfaces of the mechanical devices used to treat the fibers. Some compression, which means pressing the fibers into themselves, is also desirable to enhance or magnify the effect of the rubbing or shearing of the fibers. The measure of the appropriate amount of shearing and compression to be used lies in the end result, which is the achievement of high bulk and low stiffness in the resulting tissue. A number of shaft dispersers or equivalent mechanical devices known in the papermaking industry can be used to achieve varying degrees of the desired results. Suitable shaft dispersers include, without limitation, nonpressurized shaft dispersers and pressurized shaft dispersers such as the Bivis machines described above. Shaft dispersers can be characterized by their relatively high volume:internal surface area ratio and rely primarily on fiber-to-fiber contact to cause fiber modification. This is in contrast with disc refiners or disc dispersers, which rely primarily on metal surface-to-fiber contact rather than fiber-to-fiber contact. While dispersing is a preferred method of modulus reduction for soft layer fibers, it is not intended that this invention be limited by the use of fibers treated in this manner. Mechanical or chemical means can be used to decrease the strength and modulus of these fibers and employed along with a strength layer to directionally reduce sheet stiffness.

Softening agents, sometimes referred to as debonders, can be used to enhance the softness of the tissue product and such softening agents can be incorporated with the fibers before, during or after dispersing. Such agents can also be sprayed or printed onto the web after formation, while wet, or added to the wet end of the tissue machine prior to formation. Suitable agents include, without limitation, fatty acids, waxes, quaternary ammonium salts, dimethyl dihydrogenated tallow ammonium chloride, quaternary ammonium methyl sulfate, carboxylated polyethylene, cocamide diethanol amine, coco betaine, sodium lauryl sarcosinate, partly ethoxylated quaternary ammonium salt, distearyl dimethyl ammonium chloride, polysiloxanes and the like. Examples of suitable commercially available chemical softening agents include, without limitation, Berocell 596 and 584 (quaternary ammonium compounds) manufactured by Eka Nobel Inc., Adogen 442 (dimethyl dihydrogenated tallow ammonium chloride) manufactured by Sherex Chemical Company, Quasoft 203 (quaternary ammonium salt) manufactured by Quaker Chemical Company, and Arquad 2HT-75 (di(hydrogenated tallow) dimethyl ammonium chloride) manufactured by Akzo Chemical Company. Suitable amounts of softening agents will vary greatly with the species selected and the desired results. Such amounts can be, without limitation, from about 0.05 to about 1 weight percent based on the weight of fiber, more specifically from about 0.25 to about 0.75 weight percent, and still more specifically about 0.5 weight percent.

Referring now to the tissue making process of this invention, the forming process and tackle can be conventional as is well known in the papermaking industry. Such formation processes include Fourdrinier, roof formers (such as suction breast roll), and gap formers (such as twin wire formers, crescent formers), etc. A twin wire former is preferred for higher speed operation. Forming wires or fabrics can also be conventional, the finer weaves with greater fiber support being preferred to produce a smoother sheet and the coarser weaves providing greater bulk. Headboxes used to deposit the fibers onto the forming fabric can be layered or nonlayered, although layered headboxes are advantageous because the properties of the tissue can be finely tuned by altering the composition of the various layers.

More specifically, for a single-ply product it is preferred to provide a three-layered tissue having dispersed fibers on both the "air side" of the tissue and on the "fabric side" of the tissue. (The "air side" refers to the side of the tissue not in contact with the fabric during drying, while the "fabric side" refers to the opposite side of the tissue which is in contact with the throughdryer fabric during drying.) The center of the tissue preferably comprises ordinary softwood fibers or secondary fibers, which have not been dispersed, to impart sufficient strength to the tissue. However, it is within the scope of this invention to include dispersed fibers in all layers. For a two-ply product, it is preferred to provide dispersed fibers on the fabric side of the tissue sheet and ply the two tissue sheets together such that the dispersed fiber layers become the outwardly facing surfaces of the product. Nevertheless, the dispersed fibers (virgin fibers or secondary fibers) can be present in any or all layers depending upon the sheet properties desired. In all cases the presence of dispersed fibers can increase Bulk and lower stiffness. The amount of dispersed fibers in any layer can be any amount from 1 to 100 weight percent, more specifically about 20 weight percent or greater, about 50 weight percent or greater, or about 80 weight percent or greater. It is preferred that the dispersed fibers be treated with a debonder as herein described to further enhance Bulk and lower stiffness.

In manufacturing the tissues of this invention, it is preferable to include a transfer fabric to improve the smoothness of the sheet and/or impart sufficient stretch. As used herein, "transfer fabric" is a fabric which is positioned between the forming section and the drying section of the web manufacturing process. The fabric can have a relatively smooth surface contour to impart smoothness to the web, yet must have enough texture to grab the web and maintain contact during a rush transfer. It is preferred that the transfer of the web from the forming fabric to the transfer fabric be carried out with a "fixed-gap" transfer or a "kiss" transfer in which the web is not substantially compressed between the two fabrics in order to preserve the caliper or bulk of the tissue and/or minimize fabric wear.

Transfer fabrics include single-layer, multi-layer or composite permeable structures. Preferred fabrics have at least one of the following characteristics: (1) On the side of the transfer fabric that is in contact with the wet web (the top side), the number of machine direction (MD) strands per inch (mesh) is from 10 to 200 (4 to 80 per centimeter) and the number of cross-machine direction (CD) strands per inch (count) is also from 10 to 200. The strand diameter is typically smaller than 0.050 inch (1.3 millimeter); and (2) on the top side, the distance between the highest point of the MD knuckle and the highest point of the CD knuckle is from about 0.001 to about 0.02 or 0.03 inch (0.025 to about 0.5 or 0.75 millimeter). In between these two levels, there can be knuckles formed either by MD or CD strands that give the topography a 3-dimensional characteristic. Specific suitable transfer fabrics include, by way of example, those made by Asten Forming Fabrics, Inc., Appleton, Wis., and designated as numbers 934, 937, 939 and 959 and Albany 94M manufactured by Albany International, Appleton Wire Division, Appleton, Wis.

In order to provide stretch to the tissue, a speed differential is provided between fabrics at one or more points of transfer of the wet web. The speed difference between the forming fabric and the transfer fabric can be from about 5 to about 75 percent or greater, preferably from about 10 to about 35 percent, and more preferably from about 15 to about 25 percent, based on the speed of the slower transfer fabric. The optimum speed differential will depend on a variety of factors, including the particular type of product being made. As previously mentioned, the increase in stretch imparted to the web is proportional to the speed differential. For a single-ply uncreped throughdried bath tissue having a basis weight of about 25 grams per square meter, for example, a speed differential of from about 20 to about 25 percent between the forming fabric and a sole transfer fabric produces a stretch in the final product of from about 15 to about 25 percent. The stretch can be imparted to the web using a single differential speed transfer or two or more differential speed transfers of the wet web prior to drying. Hence there can be one or more transfer fabrics. The amount of stretch imparted to the web can hence be divided among one, two, three or more differential speed transfers. The web is transferred to the last fabric (the throughdrying fabric) for final drying preferably with the assistance of vacuum to ensure macroscopic rearrangement of the web to give the desired Bulk and appearance. The use of separate transfer and throughdrying fabrics offers a significant improvement over the prior art since it allows the two fabrics to be designed specifically to address key product requirements independently. For example, the transfer fabrics are generally optimized to allow efficient conversion of high rush transfer levels to high MD stretch and to improve sheet smoothness while throughdrying fabrics are designed to deliver bulk and CD stretch. It is therefore useful to have quite fine and relatively planar transfer fabrics and throughdrying fabrics which are quite coarse and three dimensional in the optimized configuration. The result is that a relatively smooth sheet leaves the transfer section and then is macroscopically rearranged (with vacuum assist) to give the high bulk, high CD stretch surface topology of the throughdrying fabric. No visible (at least not macroscopically visible) trace of the transfer fabric remains in the finished product. Sheet topology is completely changed from transfer to throughdrying fabric and fibers are macroscopically rearranged, including significant fiber-fiber movement.

The drying process can be any noncompressive drying method which tends to preserve the bulk or thickness of the wet web including, without limitation, throughdrying, infrared radiation, microwave drying, etc. Because of its commercial availability and practicality, throughdrying is well-known and is a preferred means for noncompressively drying the web for purposes of this invention. Suitable throughdrying fabrics include, without limitation, Asten 920A and 937A and Velostar P800 and 103A. The web is preferably dried to final dryness on the throughdrying fabric, without being pressed against the surface of a Yankee dryer, and without subsequent creping. This provides a product of relatively uniform density as compared to products made by a process in which the web was pressed against a Yankee while still wet and supported by the throughdrying fabric or by another fabric, or as compared to spot-bonded airlaid products. Although the final product appearance and bulk are dominated by the throughdrying fabric design, the machine direction stretch in the web is primarily provided by the transfer fabric, thus giving the method of this invention greater process flexibility.

DETAILED DESCRIPTION OF THE INVENTION

Figure 1:
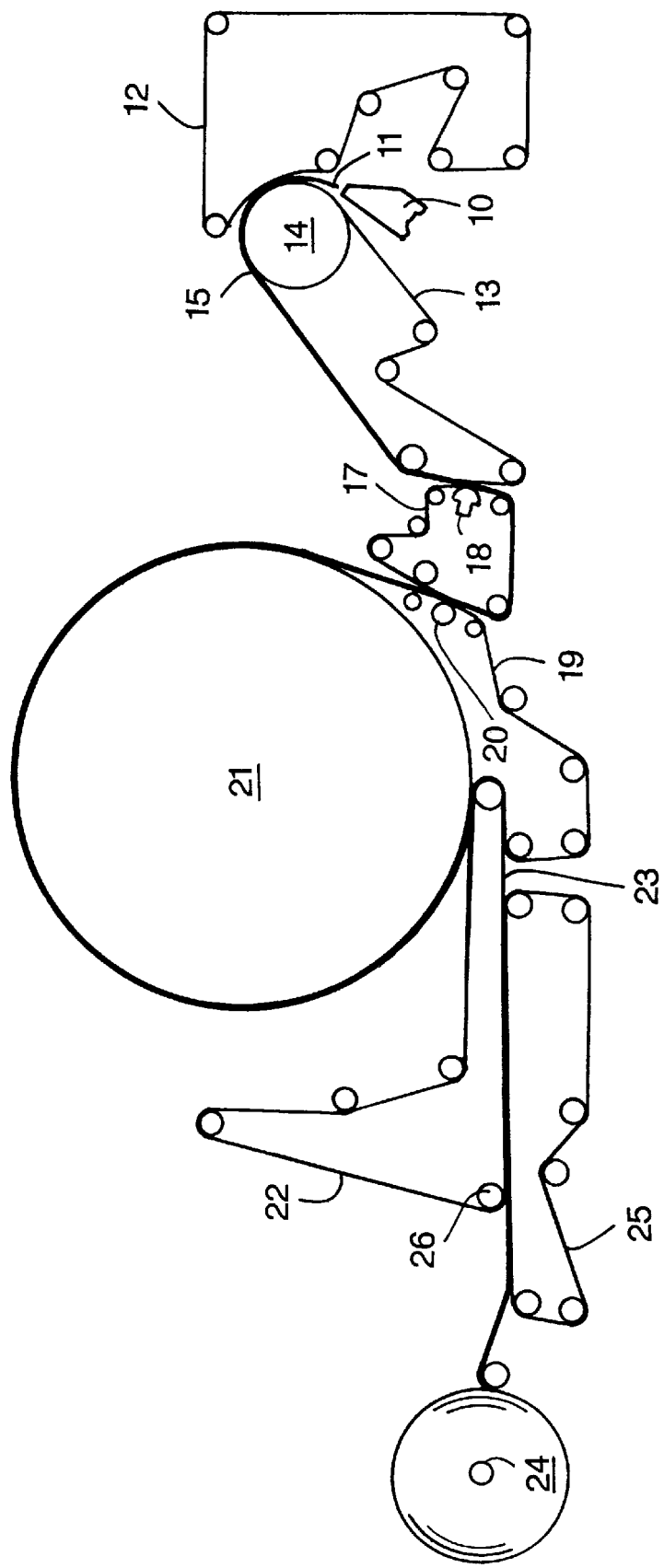
FIG. 1 is a schematic process flow diagram illustrating a method of making uncreped throughdried sheets in accordance with this invention.

Directing attention to the Drawing, the invention will be described in further detail.

FIG. 1 illustrates a means for carrying out the method of this invention. (For simplicity, the various tensioning rolls schematically used to define the several fabric runs are shown but not numbered. It will be appreciated that variations from the apparatus and method illustrated in FIG. 1 can be made without departing from the scope of the invention.) Shown is a twin wire former having a layered papermaking headbox 10 which injects or deposits a stream 11 of an aqueous suspension of papermaking fibers onto the forming fabric 13 which serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 17 traveling at a slower speed than the forming fabric in order to impart increased stretch into the web. Transfer is preferably carried out with the assistance of a vacuum shoe 18 and a fixed gap or space between the forming fabric and the transfer fabric or a kiss transfer to avoid compression of the wet web.

The web is then transferred from the transfer fabric to the throughdrying fabric 19 with the aid of a vacuum transfer roll 20 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer is preferably carried out with vacuum assistance to ensure deformation of the sheet to conform to the throughdrying fabric, thus yielding desired Bulk and appearance.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is final dried to a consistency of about 94 percent or greater by the throughdryer 21 and thereafter transferred to a carrier fabric 22. The dried basesheet 23 is transported to the reel 24 using carrier fabric 22 and an optional carrier fabric 25. An optional pressurized turning roll 26 can be used to facilitate transfer of the web from carrier fabric 22 to fabric 25. Suitable carrier fabrics for this purpose are Albany International 84M or 94M and Asten 959 or 937, all of which are relatively smooth fabrics having a fine pattern. Although not shown, reel calendering or subsequent off-line calendering can be used to improve the smoothness and softness of the basesheet.

Figure 2:
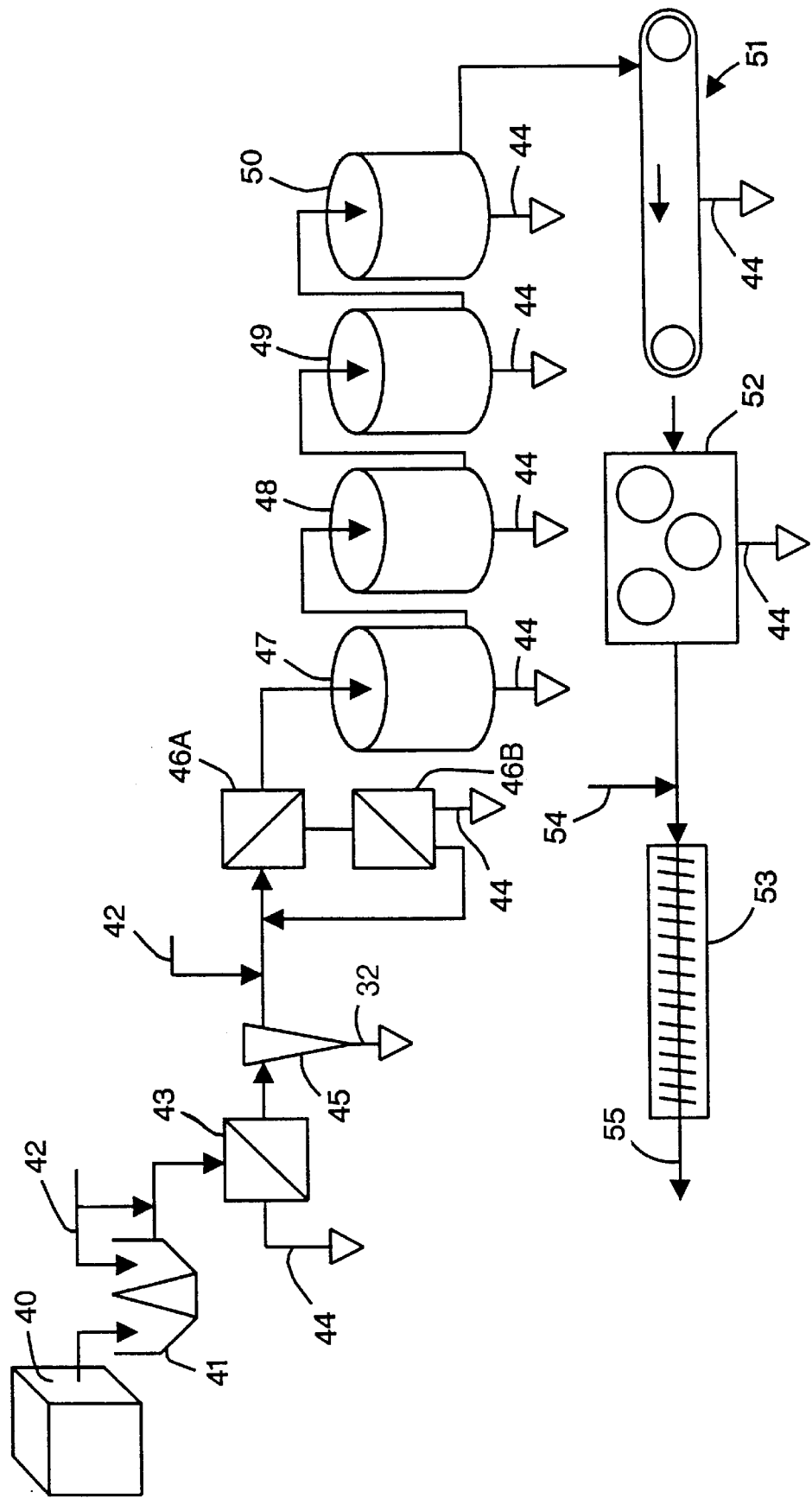
FIG. 2 is a schematic process flow diagram of a method of treating fibers in accordance with this invention using a shaft disperser to work the fibers.

FIG. 2 is a block flow diagram illustrating overall process steps for treating secondary papermaking fibers in preparation for dispersing. (For virgin fibers, the fibers can be slurried with water to the desired consistency and introduced directly into the disperser). Shown is the paper furnish 40 to be treated being fed to a high consistency pulper 41 (Model ST6C-W, Bird Escher Wyss, Mansfield, Mass.) with the addition of dilution water 42 to reach a consistency of about 15 percent. Prior to being pumped out of the pulper, the stock is diluted to a consistency of about 6 percent. The pulped fibers are fed to a scalping screen 43 (Fiberizer Model FT-E, Bird Escher Wyss) with additional dilution water in order to remove large contaminants. The input consistency to the scalping screen is about 4 percent. The rejects from the scalping screen are directed to waste disposal 44. The accepts from the scalping screen are fed to a high density cleaner 45 (Cyclone Model 7 inch size, Bird Escher Wyss) in order to remove heavy contaminants which have escaped the scalping screen. The rejects from the high density cleaner are directed to waste disposal. The accepts from the high density cleaner are fed to a fine screen 46A (Centrisorter Model 200, Bird Escher Wyss) to further remove smaller contaminants. Dilution water is added to the fine screen feed stream to achieve a feed consistency of about 2 percent. Rejects from the fine screen are directed to a second fine screen 46B (Axiguard, Model 1, Bird Escher Wyss) to remove additional contaminants. The accepts are recycled to the feed stream to the fine screen 46A and the rejects are directed to waste disposal. The accepts from the fine screen, with the addition of dilution water to reach a consistency of about 1 percent, are then passed to a series of four flotation cells 47, 48, 49 and 50 (Aerator Model CF1, Bird Escher Wyss) to remove ink particles and stickies. Rejects from each of the flotation cells are directed to waste disposal. The accepts from the last flotation cell are fed to a washer 51 (Double Nip Thickener Model 100, Black Clawson Co., Middletown, Ohio) to remove very small ink particles and increase the consistency to about 10 percent. Rejects from the washer are directed to waste disposal. The accepts from the washer are fed to a belt press 52 (Arus-Andritz Belt Filter Press Model CPF 20 inches, Andritz-Ruthner Inc., Arlington, Tex.) to reduce the water content to about 30 percent. Rejects from the belt press are directed to waste disposal. The resulting partially dewatered fibrous material is then fed to a shaft disperser 53 (GR 11, Ing. S. Maule & C. S.p.A., Torino, Italy), described in detail in FIG. 4, in order to work the fibers to improve their properties in accordance with this invention. Steam 54 is added to the disperser feed stream to elevate the temperature of the feed material. The resulting treated fibers 55 can be directly used as feedstock for papermaking or otherwise further treated as desired.

Figure 3:
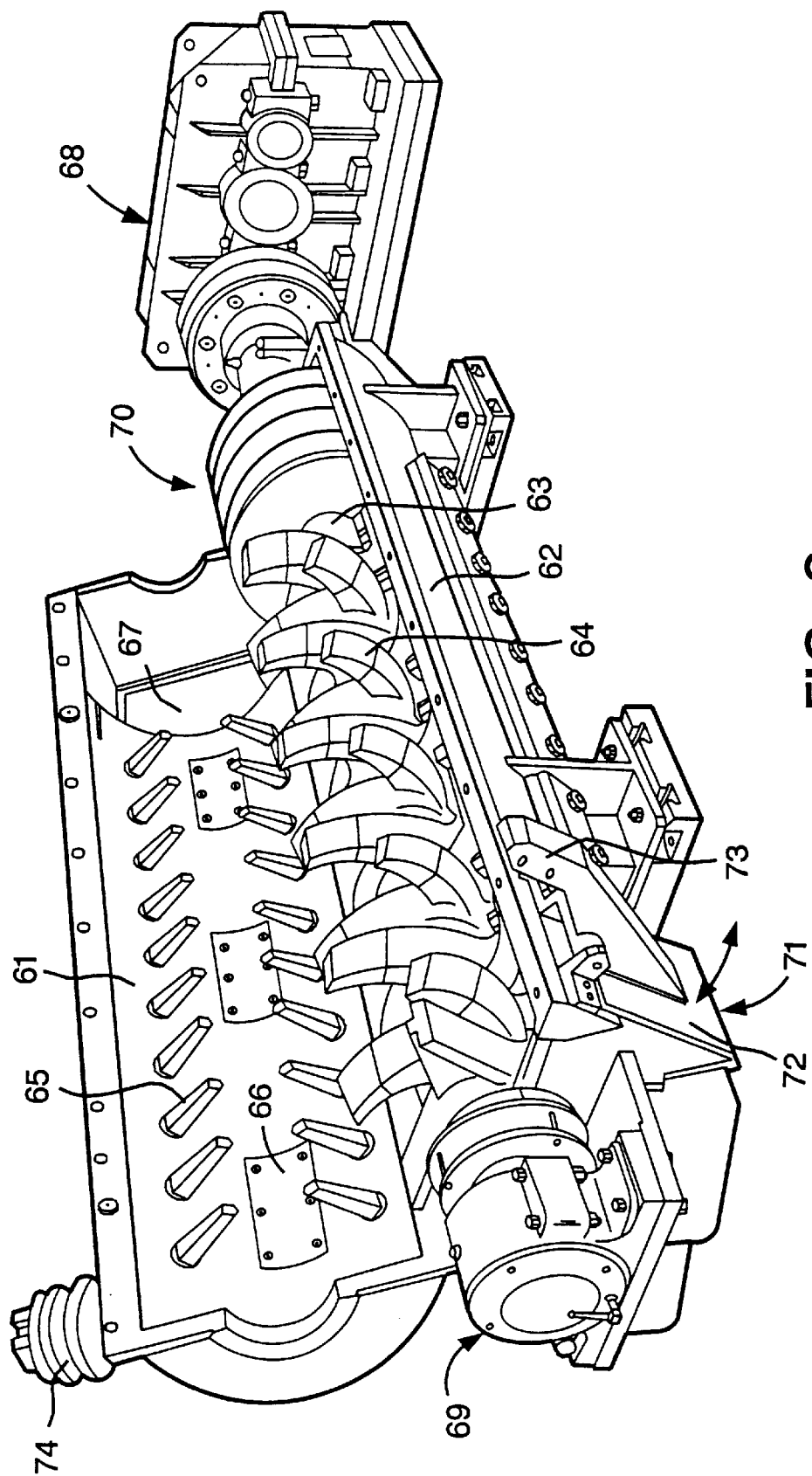
FIG. 3 is a cut-away perspective view of the shaft disperser of FIG. 2.

FIG. 3 is a cut-away perspective view of a preferred apparatus for treating fibers in accordance with this invention as illustrated in FIG. 2. The particular apparatus is a shaft disperser, Type GR II, manufactured by Ing. S. Maule & C. S.p.A., Torino, Italy. Shown are an upper cylindrical housing 61 and a lower cylindrical housing 62 which, when closed, enclose a rotating shaft 63 having a multiplicity of arms 64. The upper housing contains two rows of knurled fingers 65 and three inspection ports 66. At one end of the upper housing is an inlet port 67. At the inlet end of the rotating shaft is driver motor 68 for turning the shaft. At the outlet end of the rotating shaft is a bearing housing 69 which supports the rotating shaft. The inlet end of the rotating shaft contains a screw feed section 70 which is positioned directly below the inlet and serves to urge the feed material through the disperser. The outlet 71 of the disperser comprises a hinged flap 72 having a lever 73 which, when the disperser is closed up, is engaged by hydraulic air bags 74 mounted on the upper housing. The air bags provide controllable resistance to the rotation of the hinged flap and hence provide a means of controlling the back pressure within the disperser. Increasing the back pressure increases the degree to which the fibers are worked. During operation, the knurled fingers interdigitate with the arms of the rotating shaft to work the feed material therebetween.

Figure 4:
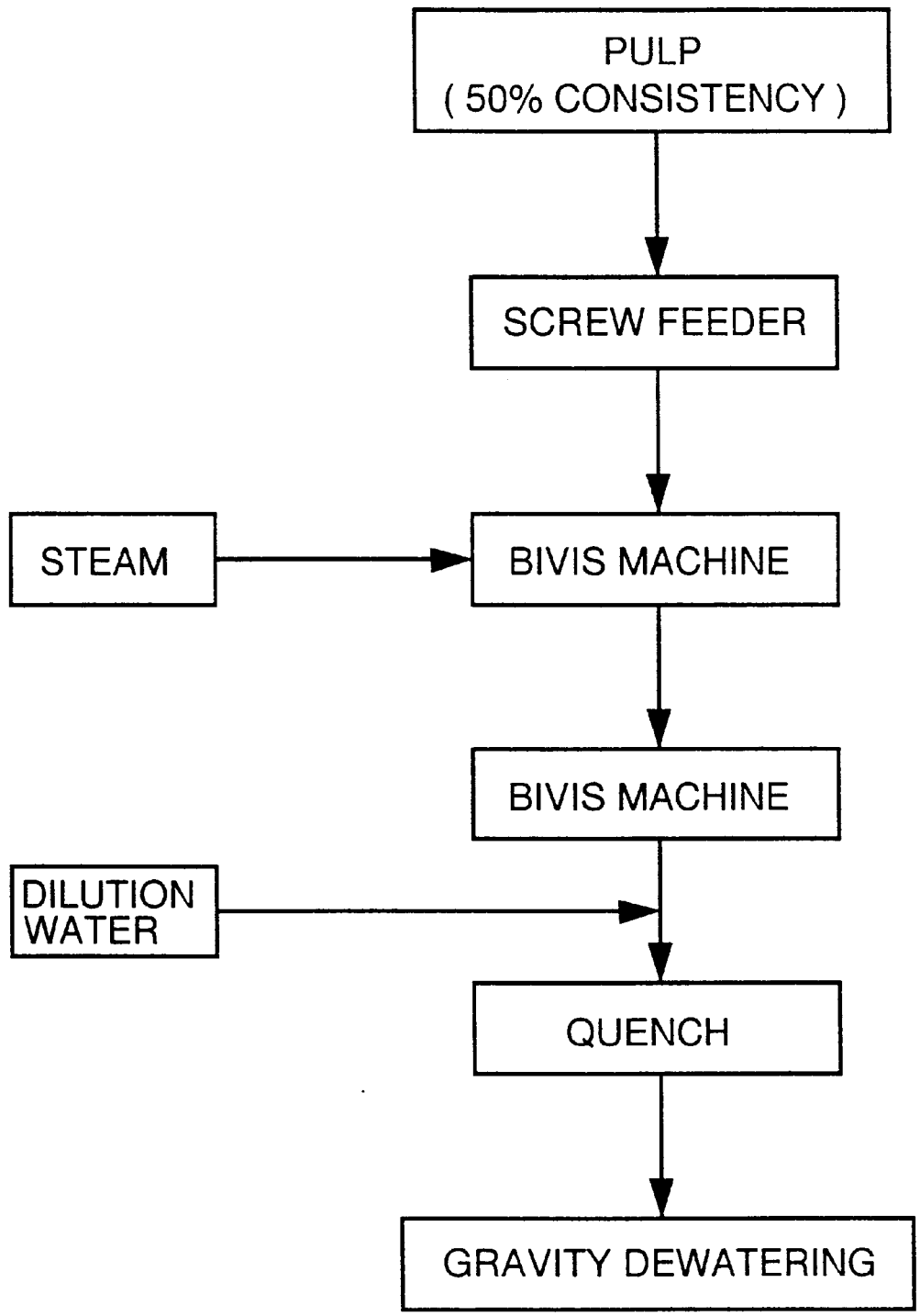
FIG. 4 is a schematic process flow diagram of an alternative method in accordance with this invention using a pair of Bivis shaft dispersers in series.

FIG. 4 is a block flow diagram of an alternative process of this invention utilizing a pair of twin shaft dispersers (Bivis machines). As illustrated, papermaking pulp, at a consistency of about 50 percent, is fed to a screw feeder. The screw feeder meters the feedstock to the first of two Bivis machines in series. Each Bivis machine has three compression/expansion zones. Steam is injected into the first Bivis machine to raise the temperature of the fibers to about 212° F. (100° C.). The worked pulp is transferred to the second Bivis machine operating at the same conditions as the first Bivis machine. The worked pulp from the second machine can be quenched by dropping it into a cold water bath and thereafter dewatering to a suitable consistency.

FIGS. 5–10 will be discussed below in connection with the Examples.

EXAMPLES

Examples 1–20. To illustrate the invention, a number of uncreped throughdried tissues were produced using the method substantially as illustrated in FIG. 1. More specifically, Examples 1–19 were all three-layered, single-ply bath tissues in which the outer layers comprised dispersed, debonded eucalyptus fibers and the center layer comprised refined northern softwood kraft fibers. Example 20 was a two-ply bath tissue, each ply being layered as described for the previous examples. Cenebra eucalyptus fibers were pulped for 15 minutes at 10% consistency and dewatered to 30% consistency. The pulp was then fed to a Maule shaft disperser as illustrated in FIG. 3. The disperser was operated at 160° F. (70° C.) with a power input of 2.2 HPD/T (1.8 kilowatt-days per tonne). Subsequent to dispersing, a softening agent (Berocell 584) was added to the pulp in the amount of 10 lb. Berocell per ton dry fiber (0.5 weight percent).

Prior to formation, the softwood fibers were pulped for 30 minutes at 2.5 percent consistency, while the dispersed, debonded eucalyptus fibers were diluted to 2 percent consistency. The overall layered sheet weight was split 37.5%/25%/37.5% among the dispersed eucalyptus/refined softwood/dispersed eucalyptus layers. The center layer was refined to levels required to achieve target strength values, while the outer layers provided softness and bulk.

These examples employed a four-layer Beloit Concept III headbox. The refined northern softwood kraft stock was used in the two center layers of the headbox to produce a single center layer for the three-layered product described. Turbulence generating inserts recessed about three inches (75 millimeters) from the slice and layer dividers extending about six inches (150 millimeters) beyond the slice were employed. Flexible lip extensions extending about six inches (150 millimeters) beyond the slice were also used, as taught in U.S. Pat. No. 5,129,988 issued Jul. 14, 1992 to Farrington, Jr. entitled "Extended Flexible Headbox Slice With Parallel Flexible Lip Extensions and Extended Internal Dividers", which is herein incorporated by reference. The net slice opening was about 0.9 inch (23 millimeters) and water flows in all four headbox layers were comparable. The consistency of the stock fed to the headbox was about 0.09 weight percent.

The resulting three-layered sheet was formed on a twin-wire, suction form roll, former with forming fabrics (12 and 13 in FIG. 1) being Asten 866 and Asten 856A fabrics respectively of about 64.5% and 61% void volume respectively. Speed of the forming fabric was 12.1 meters per second. The newly-formed web was then dewatered to a consistency of about 20–27% using vacuum suction from below the forming fabric before being transferred to the transfer fabric which was traveling at 9.7 meters per second (25% rush transfer). Transfer fabrics employed included an Asten 934 and an Albany 94M. A vacuum shoe pulling about 6–15 inches (150–380 millimeters) of mercury vacuum was used to transfer the web to the transfer fabric.

The web was then transferred to a throughdrying fabric traveling at a speed of about 9.7 meters per second. Velostar 800 and Asten 934 throughdrying fabrics were used. The web was carried over a Honeycomb throughdryer operating at a temperature of about 350° F. (175° C.) and dried to a final dryness of about 94–98% consistency.

Table 1 gives more detailed descriptions of the process condition as well as resulting tissue properties for examples 1–20, illustrating this invention. As used in Tables 1 and 2 below, the column headings have the following meanings: "TAD Fabric" means throughdrying fabric (the designation "W" or "S" for the throughdrying fabric refers to which side of the fabric is presented to the web. "W" denotes the side dominated by warp knuckles and "S" denotes the side dominated by shute knuckles.); "#1 Trans Vac" is the vacuum used to transfer the web from the forming fabric to the transfer fabric, expressed in millimeters of mercury; "#2 Trans Vac" is the vacuum used to transfer the web from the transfer fabric to the throughdrying fabric, expressed in millimeters of mercury; "Cons @#1 Trans" is the consistency of the web at the point of transfer from the forming fabric to the transfer fabric, expressed as percent solids; "Cons @#2 Trans" is the consistency of the web at the point of transfer from the transfer fabric to the throughdrying fabric, expressed as percent solids; "MD Tensile Strength" is the machine direction tensile strength, expressed in grams per 3 inches (7.62 centimeters) of sample width; "MD Tensile Stretch" is the machine direction stretch, expressed as percent elongation at sample failure; "MD Max Slope" is as defined above, expressed as kilograms per 3 inches (7.62 centimeters) of sample width; "CD Tensile Strength" is the cross-machine tensile strength, expressed as grams per 3 inches (7.62 centimeters) of sample width; "CD Tensile Stretch" is the cross-machine direction stretch, expressed as percent elongation at sample failure; "GMT" is the geometric mean tensile strength, expressed as grams per 3 inches (7.62 centimeters) of sample width; "Basis Wt" is the finished basis weight, expressed as grams per square meter; "Caliper" is the 10 sheet caliper, divided by ten, as previously described, expressed in microns; "Bulk" is the Bulk as defined above, expressed in cubic centimeters per gram; "Panel Stiff" is the stiffness of the sheet as determined by a trained sensory panel feeling for the relative sharpness of the folds when a sheet is taken up into the hand, expressed as a number on a scale of from 1 to 14, with higher numbers meaning greater stiffness (commercial bath tissues typically range from about 3 to about 8); and "MD Stiff Factor" is the Machine Direction Stiffness Factor as defined above, expressed as (kilograms per 3 inches)-microns$^{0.5}$.

TABLE 1

| EXAMPLE | TRANSFER FABRIC | TAD FABRIC | #1 TRANS VAC | #2 TRANS VAC | CONS ∂#1 TRANS | CONS ∂#2 TRANS | MD TENSILE STRENGTH | MD TENSILE STRETCH | MD MAX SLOPE |
|---|---|---|---|---|---|---|---|---|---|
| 1 | ALBANY 94M W | VELOSTAR | 380 | 200 | 20–22 | 22–24 | 775 | 19.2 | 5.087 |
| 2 | ASTEN 934 W | ASTEN 934 | 380 | 100 | 20–22 | 27–29 | 721 | 19.3 | 4.636 |
| 3 | ASTEN 934 W | ASTEN 934 | 150 | 100 | 20–22 | 22–24 | 712 | 18.9 | 4.815 |
| 4 | ALBANY 94M S | VELOSTAR | 150 | 200 | 20–22 | 27–29 | 799 | 19.2 | 5.149 |
| 5 | ALBANY 94M S | VELOSTAR | 380 | 100 | 20–22 | 27–29 | 834 | 22.0 | 5.223 |
| 6 | ALBANY 94M S | ASTEN 934 | 380 | 100 | 20–22 | 27–29 | 897 | 20.2 | 5.621 |
| 7 | ALBANY 94M S | VELOSTAR | 150 | 100 | 20–22 | 22–24 | 815 | 19.1 | 5.543 |
| 8 | ALBANY 94M W | VELOSTAR | 150 | 100 | 25–27 | 27–29 | 843 | 21.7 | 5.698 |
| 9 | ALBANY 94M W | VELOSTAR | 380 | 100 | 20–22 | 27–29 | 867 | 20.0 | 5.696 |
| 10 | ASTEN 934 W | ASTEN 934 | 380 | 200 | 20–22 | 22–24 | 721 | 20.6 | 4.709 |
| 11 | ALBANY 94M S | VELOSTAR | 380 | 200 | 25–27 | 27–29 | 819 | 20.2 | 5.441 |
| 12 | ASTEN 934 W | ASTEN 934 | 150 | 200 | 20–22 | 27–29 | 709 | 20.2 | 4.913 |
| 13 | ALBANY 94M W | VELOSTAR | 380 | 200 | 25–27 | 27–29 | 531 | 20.1 | 3.496 |
| 14 | ASTEN 934 W | ASTEN 934 | 380 | 200 | 25–27 | 27–29 | 472 | 19.5 | 3.244 |
| 15 | ALBANY 94M S | VELOSTAR | 380 | 200 | 25–27 | 27–29 | 631 | 21.4 | 4.036 |
| 16 | ASTEN 937 S | ASTEN 934 | 380 | 200 | 25–27 | 27–29 | 535 | 20.9 | 3.933 |
| 17 | VELOSTAR 800W | ASTEN 934 | 380 | 200 | 25–27 | 27–29 | 427 | 16.3 | 3.901 |
| 18 | ASTEN 934 S | ASTEN 934 | 380 | 200 | 25–27 | 27–29 | 530 | 21.3 | 4.206 |
| 19 | ALBANY 94M S | VELOSTAR | 380 | 200 | 25–27 | 27–29 | 600 | 20.8 | 4.754 |
| 20 | ALBANY 94M S | VELOSTAR | 380 | 200 | 25–27 | 27–29 | 708 | 18.7 | 5.970 |

| EXAMPLE | CD TENSILE STRENGTH | CD TENSILE STRETCH | GMT | BASIS WT | CALIPER | BULK | PANEL STIFF | MD STIFF FACTOR |
|---|---|---|---|---|---|---|---|---|
| 1 | 557 | 8.5 | 657 | 29.2 | 287 | 9.8 | 4.1 | 86 |
| 2 | 529 | 5.4 | 618 | 28.7 | 323 | 11.2 | 4.0 | 83 |
| 3 | 563 | 5.0 | 633 | 28.8 | 323 | 11.2 | 4.1 | 86 |
| 4 | 534 | 8.2 | 654 | 28.9 | 305 | 10.5 | 4.6 | 90 |
| 5 | 629 | 6.9 | 725 | 30.2 | 305 | 10.1 | 4.7 | 91 |
| 6 | 632 | 3.9 | 753 | 29.3 | 287 | 9.8 | 4.5 | 95 |
| 7 | 571 | 6.9 | 682 | 28.9 | 297 | 10.3 | 4.5 | 96 |
| 8 | 623 | 6.4 | 724 | 28.7 | 292 | 10.2 | 4.7 | 97 |
| 9 | 638 | 7.2 | 744 | 29.7 | 297 | 10.0 | 4.6 | 98 |
| 10 | 511 | 5.3 | 607 | 28.3 | 361 | 12.7 | 3.5 | 89 |
| 11 | 577 | 7.9 | 687 | 29.1 | 312 | 10.7 | 4.2 | 96 |
| 12 | 503 | 5.2 | 598 | 28.9 | 348 | 12.0 | 4.0 | 92 |
| 13 | 428 | 8.3 | 477 | 20.7 | 249 | 12.0 | 3.5 | 55 |
| 14 | 324 | 6.0 | 391 | 19.6 | 315 | 16.0 | 3.4 | 58 |
| 15 | 356 | 11.2 | 474 | 19.8 | 269 | 13.5 | 3.4 | 66 |
| 16 | 383 | 5.8 | 453 | 20.1 | 325 | 16.1 | 3.8 | 71 |
| 17 | 306 | 14.8 | 362 | 19.6 | 330 | 16.8 | 3.4 | 71 |
| 18 | 299 | 9.4 | 398 | 19.9 | 335 | 16.8 | 3.2 | 77 |

TABLE 1-continued

| | | | | | | | | |
|---|---|---|---|---|---|---|---|---|
| 19 | 415 | 4.5 | 499 | 20.0 | 287 | 14.3 | 3.8 | 81 |
| 20 | 494 | 8.6 | 591 | 38.0 | 388 | 10.1 | 3.2 | 83 |

Referring now to FIGS. 5–10, various aspects of the invention will be described in further detail.

Figure 5:
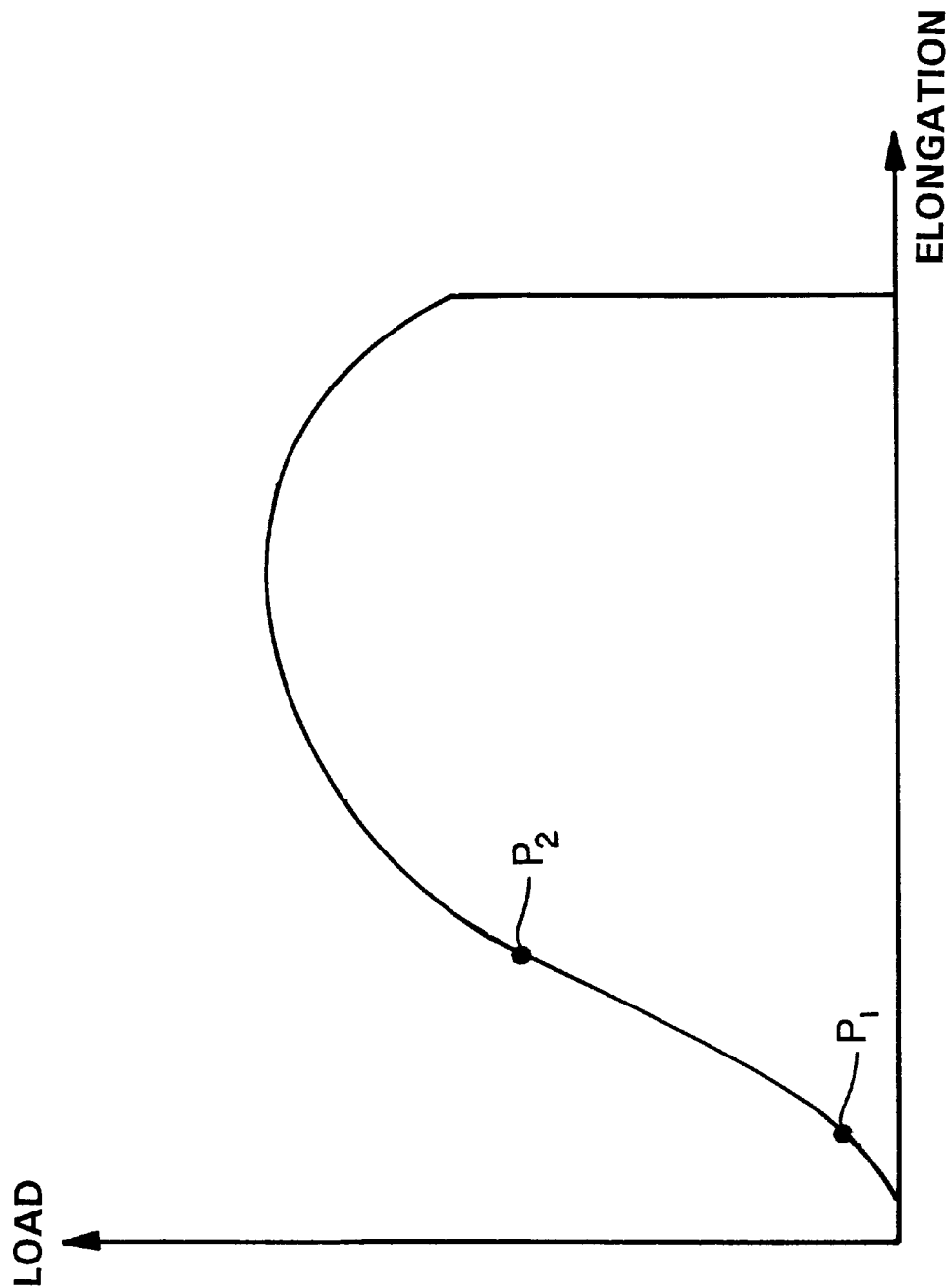
FIG. 5 is a generalized plot of a load/elongation curve for tissue, illustrating the determination of the MD Max Slope.

FIG. 5 is a generalized load/elongation curve for a tissue sheet, illustrating the determination of the MD Max Slope. As shown, two points P1 and P2, the distance between which is exaggerated for purposes of illustration, are selected that lie along the load/elongation curve. The tensile tester is programmed (GAP [General Applications Program], version 2.5, Systems Integration Technology Inc., Stoughton, Mass.; a division of MTS Systems Corporation, Research Triangle Park, N.C.) such that it calculates a linear regression for the points that are sampled from P1 to P2. This calculation is done repeatedly over the curve by adjusting the points P1 and P2 in a regular fashion along the curve (hereinafter described). The highest value of these calculations is the Max Slope and, when performed on the machine direction of the specimen, is called the MD Max Slope.

The tensile tester program should be set up such that five hundred points such as P1 and P2 are taken over a two and one-half inch (63.5 mm) span of elongation. This provides a sufficient number of points to exceed essentially any practical elongation of the specimen. With a ten inch per minute (254 mm/min) crosshead speed, this translates into a point every 0.030 seconds. The program calculates slopes among these points by setting the 10th point as the initial point (for example P1), counting thirty points to the 40th point (for example, P2) and performing a linear regression on those thirty points. It stores the slope from this regression in an array. The program then counts up ten points to the 20th point (which becomes P1) and repeats the procedure again (counting thirty points to what would be the 50th point (which becomes P2), calculating that slope and also storing it in the array). This process continues for the entire elongation of the sheet. The Max Slope is then chosen as the highest value from this array. The units of Max Slope are kg per three-inch specimen width. (Strain is, of course, dimensionless since the length of elongation is divided by the length of the jaw span. This calculation is taken into account by the testing machine program.)

Figure 6:
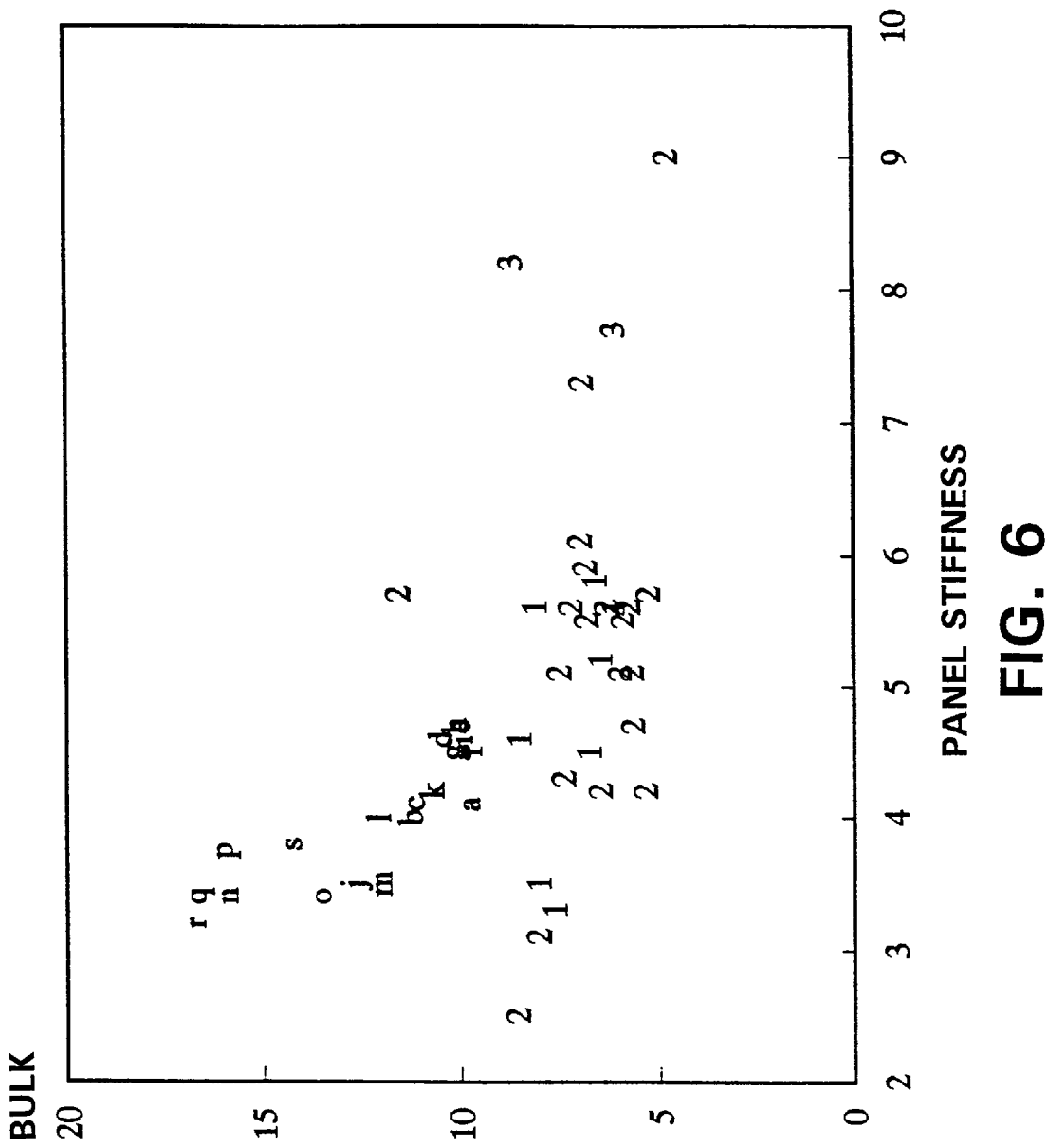
FIG. 6 is a plot of Bulk versus Panel Stiffness (stiffness as determined by a trained sensory panel) for the bath tissues made in accordance with this invention and commercially available creped bath tissues, illustrating the high level of bulk and low stiffness exhibited by the products of this invention.

FIG. 6 is a plot of Bulk versus Panel Stiffness for bath tissues made in accordance with this invention (Examples 1–20 plotted as points a–t, respectively) and for a number of commercially available creped bath tissues plotted as either a "1" representing a single-ply product, a "2" representing a two-ply product and a "3" representing a three-ply product. This plot illustrates the unique combination of high Bulk and low stiffness possessed by the products of this invention.

Figure 7:
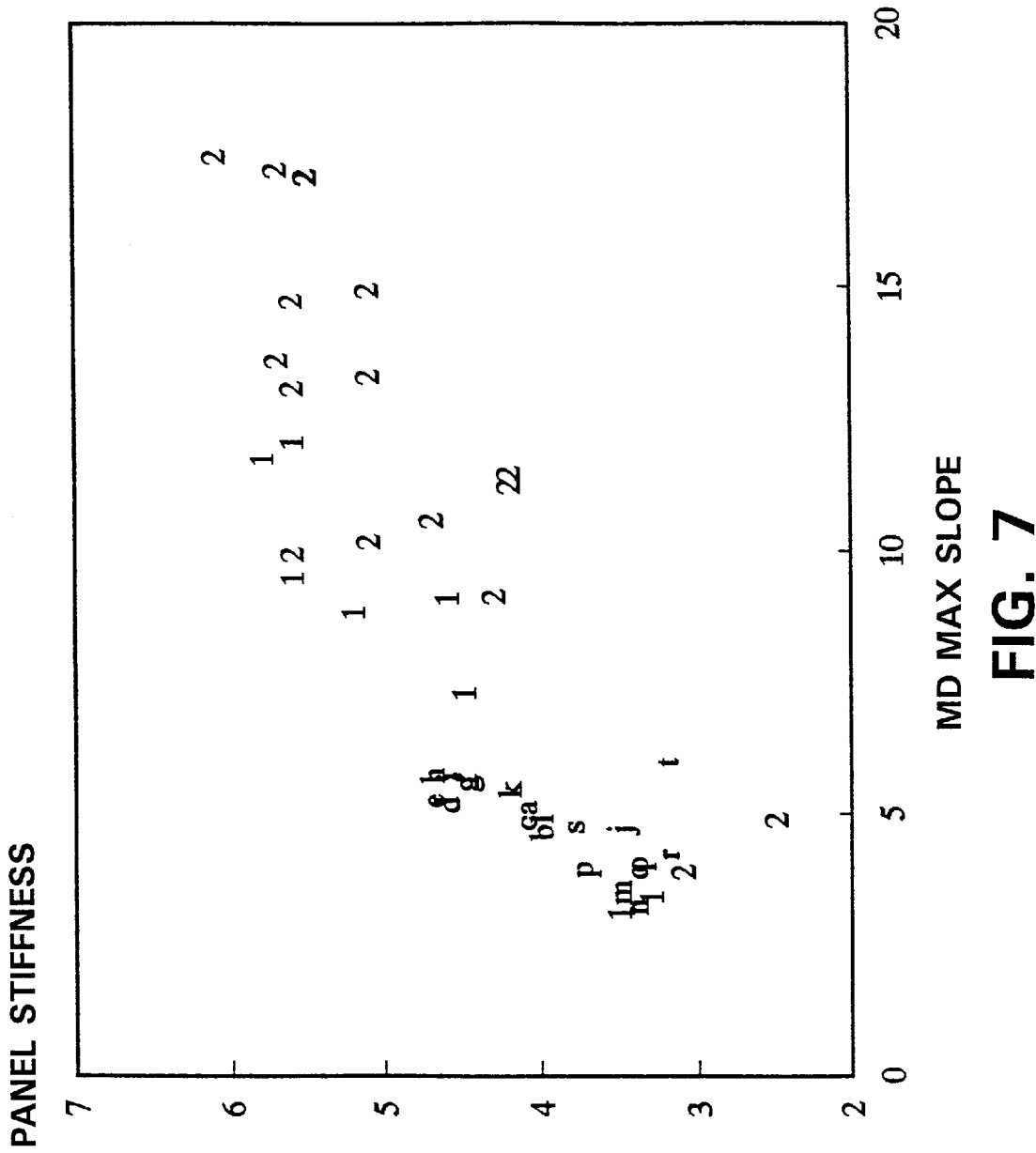
FIG. 7 is a plot of Panel Stiffness versus MD Max Slope for the bath tissues made in accordance with this invention and commercially available bath tissues, illustrating the correlation of Panel Stiffness with the MD Max Slope.

FIG. 7 is a plot of Panel Stiffness versus MD Max Slope for the same products, illustrating the correlation of MD Max Slope with stiffness as measured by a trained sensory panel. This plot shows that MD Max Slope is an objective measure of panel stiffness.

Figure 8:
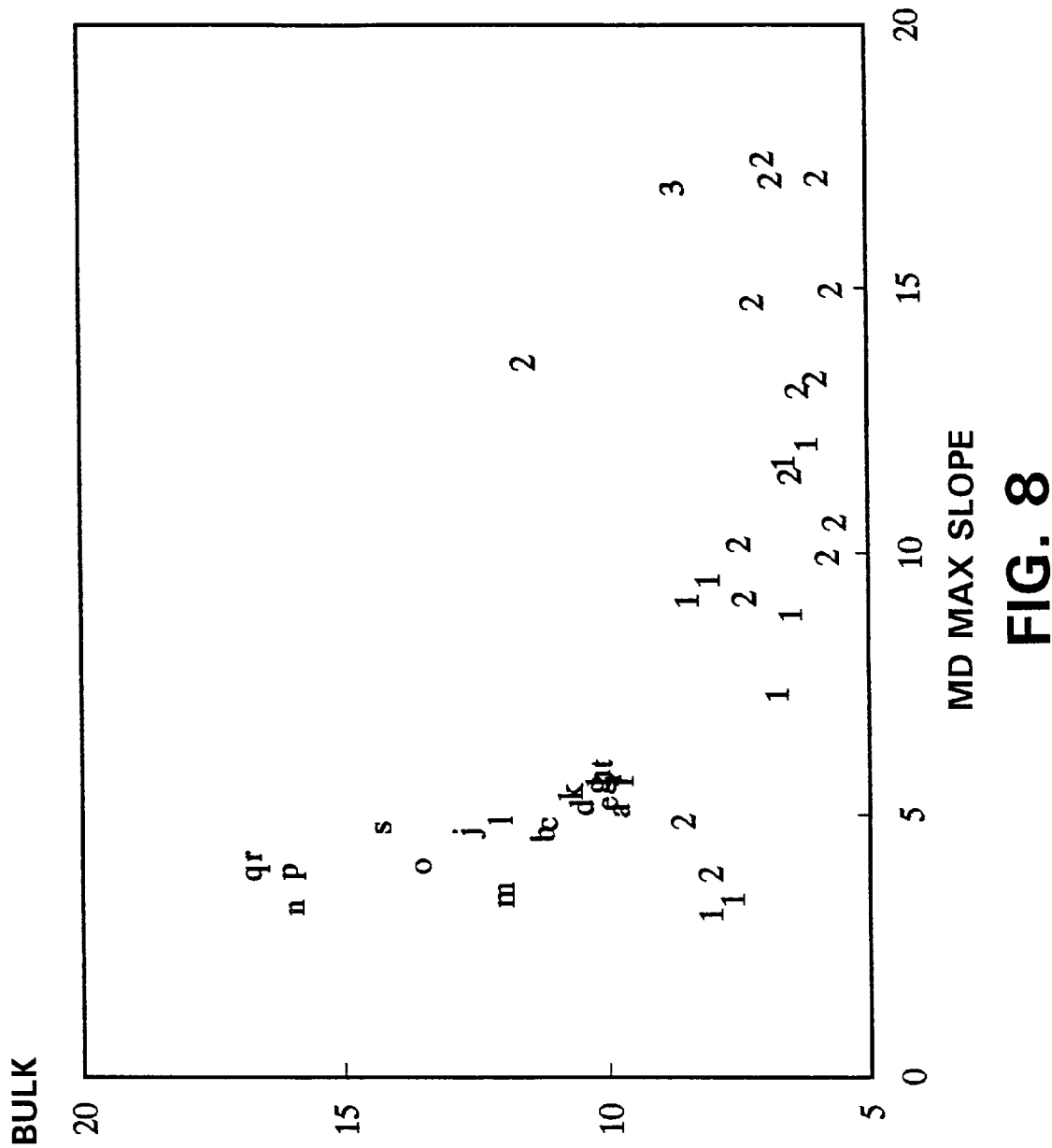
FIG. 8 is a plot of Bulk versus MD Max Slope for the bath tissues made in accordance with this invention and commercially available bath tissues, further illustrating the high Bulk and low stiffness exhibited by the products of this invention.

FIG. 8 is a plot of Bulk versus MD Max Slope for the same products, illustrating the combination of high Bulk and low stiffness (as measured by the MD Max Slope) exhibited by the products of this invention.

Figure 9:
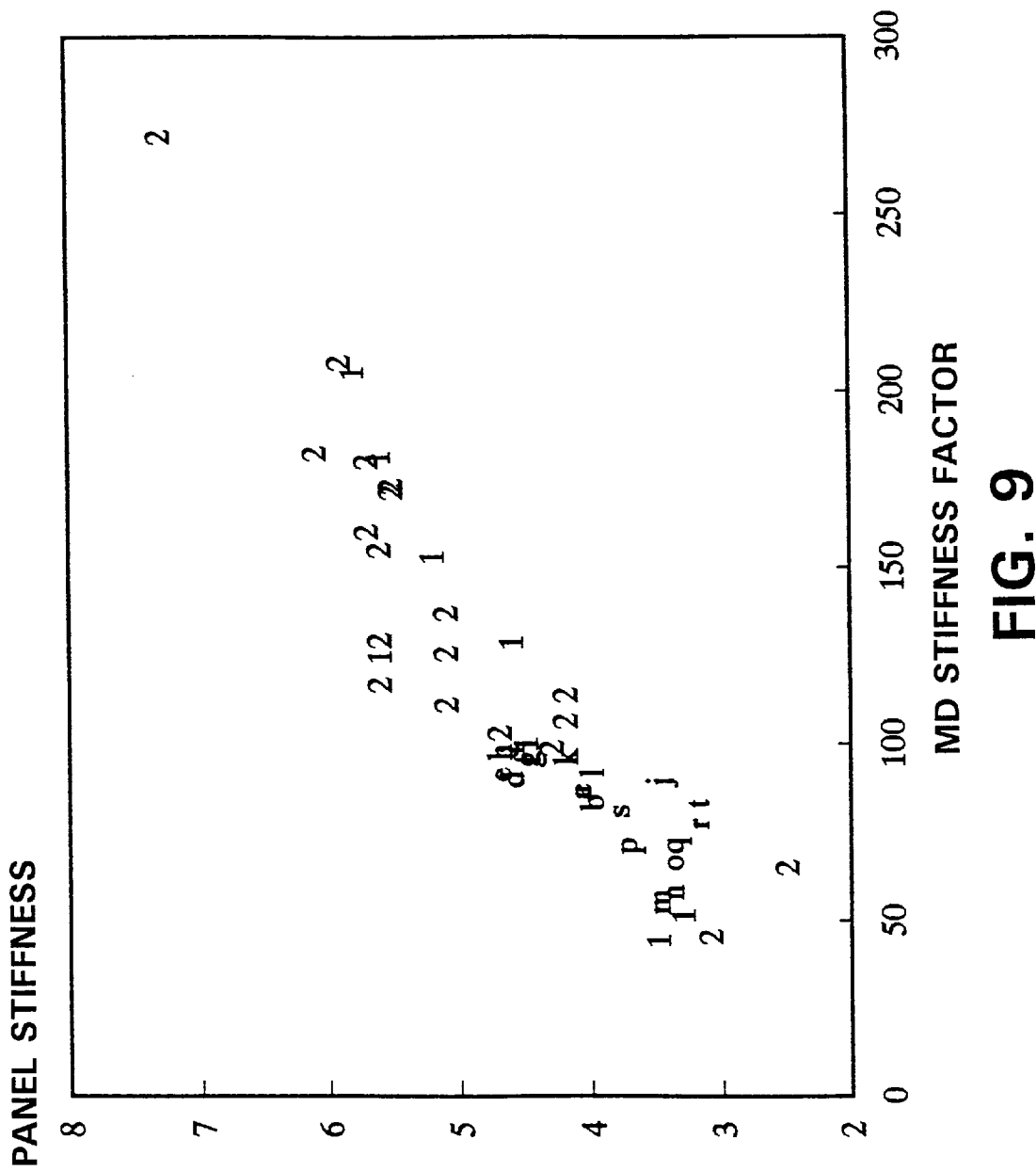
FIG. 9 is a plot similar to that of FIG. 8, but for Panel Stiffness versus MD Stiffness Factor, illustrating the correlation of Panel Stiffness and the MD Stiffness Factor.

FIG. 9 is a plot similar to the plot of FIG. 7, but Panel Stiffness is plotted against the MD Stiffness Factor instead of MD Max Slope, illustrating that the MD Stiffness Factor is also a valid measure of stiffness.

Figure 10:
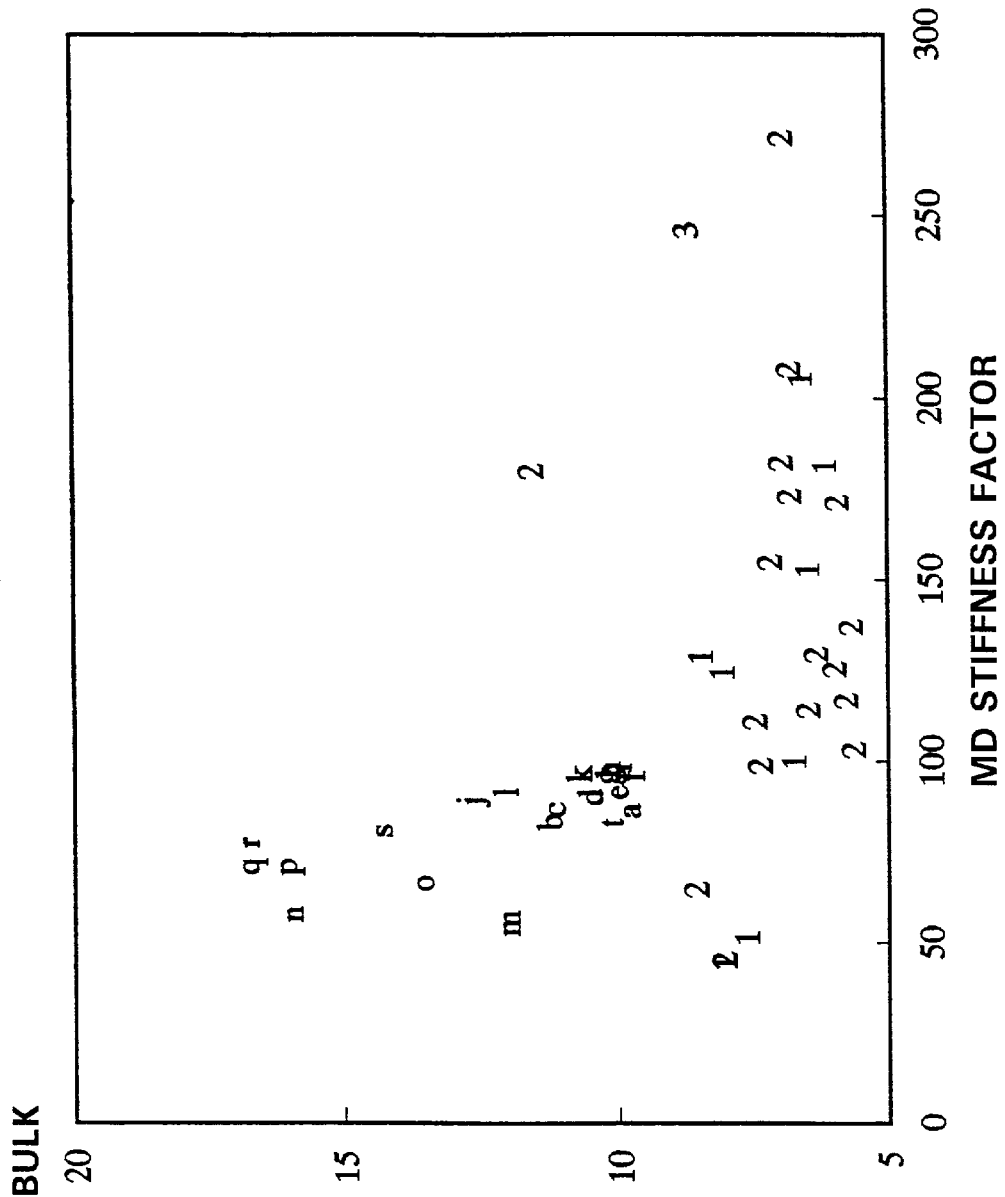
FIG. 10 is a plot similar to that of FIG. 9, but for Bulk versus the MD Stiffness Factor, further illustrating the high Bulk and low stiffness of the products of this invention.

FIG. 10 is a plot similar to the plot of FIG. 8 with Bulk plotted versus the MD Stiffness Factor, illustrating the combination of high Bulk and low stiffness (as measured by the MD Stiffness Factor) exhibited by the products of this invention.

It will be appreciated that the foregoing examples, given for purposes of illustration, are not to be construed as limiting the scope of this invention, which is defined by the following claims and all equivalents thereto.

We claim:

1. A method for making a tissue comprising:
   (a) forming an aqueous suspension comprising paper-making fibers consisting essentially of hardwood fibers;
   (b) dispersing the fibers in the aqueous suspension;
   (c) diluting the suspension of dispersed paper-making fibers and feeding the diluted suspension to a paper machine forming section;
   (d) noncompressively dewatering the diluted suspension in the forming section to form a wet web;
   (e) rush transferring the wet web from the forming section to a transfer fabric;
   (f) transferring the wet web from the transfer fabric to a drying fabric, wherein the wet web is conformed to the contours of the drying fabric; and
   (g) drying the wet web to form a tissue.

2. A method of making a tissue comprising:
   (a) making an aqueous suspension comprising paper-making fibers;
   (b) noncompressively dewatering the aqueous suspension to form a wet web having a consistency of at least about 10% solids;
   (c) rush transferring the wet web to a first fabric having a relatively smooth surface contour;
   (d) removing the wet web from the first fabric;
   (e) transferring and conforming the wet web to the surface contours of a second fabric; and
   (f) drying the wet web, while supported on the second fabric, by a noncompressive method to form a tissue.

3. A method of making a tissue comprising:
   (a) making an aqueous suspension comprising paper-making fibers;
   (b) noncompressively dewatering the aqueous suspension to form a wet web having a consistency of at least about 10% solids;
   (c) rush transferring the wet web to a transfer fabric;
   (d) transferring the wet web to a throughdrying fabric whereby the wet web is macroscopically rearranged to conform to the surface of the throughdrying fabric; and
   (e) throughdrying the wet web to form a tissue.

4. A method of making a tissue comprising:
   (a) making a first aqueous suspension comprising paper-making fibers consisting essentially of dispersed hardwood fibers;
   (b) making a second aqueous suspension comprising paper-making fibers consisting essentially of softwood fibers;

(c) adding at least about 0.05% softening agents to the first aqueous suspension;

(d) diluting the aqueous suspensions and feeding the diluted aqueous suspensions to a multilayer forming section of a tissue-making machine;

(e) in the forming section forming the first aqueous suspension into a first layer of a wet web and forming the second aqueous suspension into a second layer of the wet web;

(f) noncompressively dewatering the wet web;

(g) rush transferring the dewatered wet web to a transfer fabric;

(h) removing the wet web from the transfer fabric and transferring the web to a throughdrying fabric; and (i) drying the wet web while supported by the throughdrying fabric to form a tissue.

* * * * *